Dec. 15, 1964  A. J. WILLIAMS  3,161,111
TWO SPEED MOTORS
Filed Jan. 31, 1963
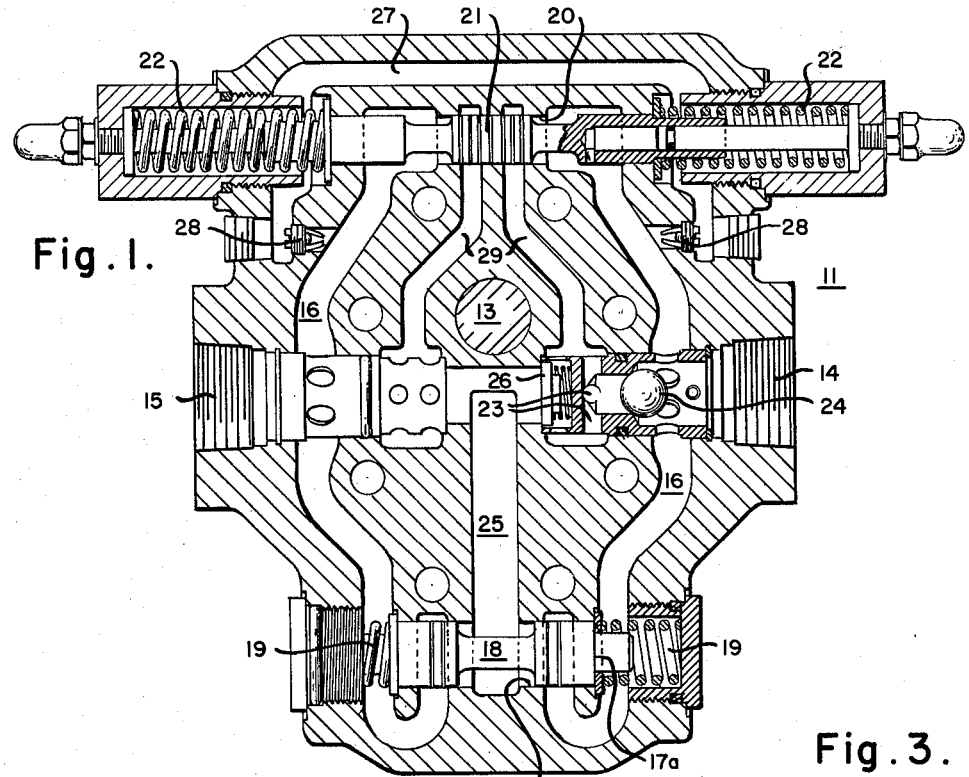
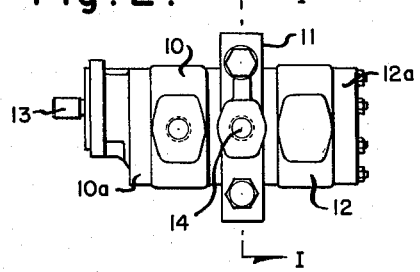
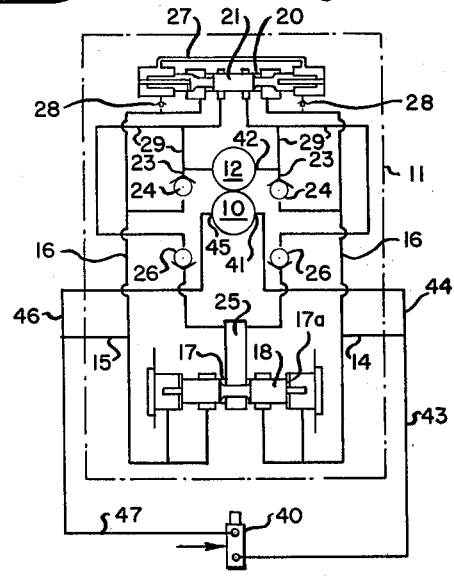
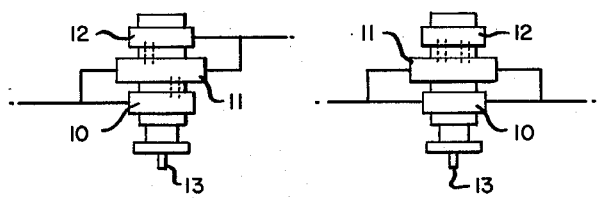
INVENTOR
Arthur J. Williams
his attorneys

3,161,111
TWO SPEED MOTORS
Arthur J. Williams, Hubbard, Ohio, assignor to Commercial Shearing & Stamping Company, a corporation of Ohio
Filed Jan. 31, 1963, Ser. No. 255,394
5 Claims. (Cl. 91—58)

This invention relates to two speed motors and particularly to a two speed hydraulic motor capable of automatically delivering a choice of high speed and low torque, or alternatively low speed and high torque.

There are many industrial applications in which a simple two speed motor is necessary or desirable. Prior to the present invention, however, no simple, automatic two speed hydraulic motor was available.

I provide a two speed hydraulic motor preferably having a pair of hydraulically driven rotors on a single shaft, a housing around said shaft and motors, a bearing carrier and motor spacer between said motors, an inlet and a discharge port on one of said motors, said inlet port receiving fluid under pressure from a pressure source and delivering said fluid to said one motor, a second inlet port receiving fluid from said pressure source, valve means in the bearing carrier acted upon by said fluid from said second port connecting the discharge port of said one motor to the other motor, second valve means in the bearing carrier acted upon by said fluid entering the second inlet port whereby said valve is opened at a selected elevated pressure to connect the second inlet with the second motor, and means closing the discharge port of said one motor to the other motor when the second valve is opened.

In the foregoing general statement I have set out certain advantages, objects, and purposes of my invention. Other objects, advantages and purposes will be apparent from a consideration of the following description and the accompanying drawings in which:

FIGURE 1 is a section on the line I—I of FIGURE 2;
FIGURE 2 is a side elevation of the motor of this invention;
FIGURE 3 is a schematic illustration of the internal hydraulic system of the motor of FIGURE 1;
FIGURE 4 is a schematic top plan view of the motor of FIGURE 1 showing one form of external piping; and
FIGURE 5 is a schematic top plan view of the motor of FIGURE 1 showing a second form of external piping.

Referring to the drawings, I have illustrated a motor 10 on one side of a central bearing support 11 and a second motor 12 on the opposite side of the bearing support 11. Each motor 10 and 12 is provided with a driven element mounted on a common shaft 13. The driven element may be a vane type rotor, a gear or any other well known driven element used in hydraulic motors. Preferably the two driven elements are of different size to provide more selectivity in operational speeds as will be more fully disclosed hereafter. In the presently described motor, I shall provide a 2" motor gear on shaft 13 in motor 10 and a 1.5" motor gear on shaft 13 in motor 12. The shaft 13 is journaled through bearing support 11 and in motor housings 10a and 12a.

The bearing support 11 is provided with ports 14 and 15 on diametrically opposite sides. Each port communicates with an internal passage 16 which extends from a lower bore 17, carrying a movable spool 18 spring loaded at each end by springs 19 to normally maintain the spool centered in the bore to close the bore 17 against passage of fluid therethrough to an upper bore 20 carrying a movable spool 21 also spring loaded at each end by springs 22 normally centering spool 21 to prevent flow of fluid from passage 16 through bore 20. The port 14 also communicates with passages 23 extending parallel to the shaft 13 and communicating with the interior of the two motor housings 10 and 12. The passages 23 are normally closed by check balls 24. The bore 17 communicates with a passage 25 which also communicates with passages 23 through check valves 26. The two ends of bore 20 are connected to a passage 27 which connects to passages 16 through normally closed check valves 28. This maintains low pressure on the spool ends. The bore 20 is connected to passages 23 and 25 by passages 29 and check valve 26.

In operation, hydraulic fluid is delivered from a source of high pressure fluid to a direction control valve 40 from which it is delivered to the port 14 of the bearing carrier by external line 43 and to the port 41 of the motor 10 by an external jumper line 44 (see FIG. 3). The fluid delivered to port 41 for example of motor 10 by jumper 44 causes that motor to rotate at relatively high speed in the counterclockwise direction (see FIG. 3). The fluid delivered to port 14 of the bearing carrier enters passage 16 and is divided between the two ends of the passage. The fluid in passage 16 acts on the end 17a of spool 18 and causes the spool to move to the left viewing FIGURES 1 and 3. The fluid passing through motor 10 goes through port 45 of motor 10 into external jumper 46 and return line 47 which is connected to port 15 in the bearing carrier and thence to passage 16 of port 15. The return fluid enters port 15, passage 16 and passes through the bore 17 to passage 25 and from passage 25 through check valve 26 entering the second motor 12 through passage 23 and port 42. This fluid acts only as a lubricant for motor 12 while motor 10 is running. The balance of the fluid returns to direction control valve 40 and thence back to the source. This produces a high speed, low torque drive.

If the load on motor 10 increases, the pressure in passage 16 increases thus acting on valve 21 to move it to the left (viewing FIGS. 1 and 3). Fluid then flows into passage 29 closing check valve 26 and through passage 23 to drive motor 12 and opens check 24 so that fluid entering port 14 is divided between motors 10 and 12 and drives each. This provides low speed, high torque operation.

If the loads fall off, the pressure required to drive the motors falls off and the valve 21 closes to change back to high speed, low torque operation.

The motors can be operated in the opposite direction in precisely the same manner by directing the flow of fluid from valve 40 to line 47.

Alternatively the operation can be arranged as in FIGURE 5 so that either motor may be the primary high speed drive depending upon direction of rotation.

While I have illustrated and described certain preferred embodiments of my invention in the foregoing specification, it will be understood that this invention may be otherwise embodied within the scope of the following claims.

I claim:

1. A two speed motor comprising a pair of hydraulically driven rotors on a single shaft, a housing around each of said rotors and said shaft, a bearing carrier and motor spacer between said motors and carrying said shaft journaled therein, an inlet and discharge port on each of said motors, the inlet port on one of said motors receiving fluid under pressure from a pressure source and delivering said fluid to said motor to drive the driven rotor therein, a carrier inlet port in said bearing carrier receiving fluid from said pressure source, valve means in the bearing carrier acted upon by said fluid from said carrier inlet port connecting the discharge port of said one motor with the inlet of the other motor, second valve means in the bearing carrier acted upon by said fluid entering the inlet port in said bearing carrier whereby said valve is opened at a selected elevated pressure to connect the said bearing carrier inlet port with the second motor to drive the driven rotor therein and means closing the discharge port of said one motor from communication with the other motor when the second valve is opened.

2. A two speed motor comprising a pair of hydraulically driven rotors on a single shaft, a housing around each of said rotors and said shaft, a bearing carrier and motor spacer between said motors and carrying said shaft journaled therein, an inlet and discharge port on each of said motors, the inlet port on one of said motors receiving fluid under pressure from a pressure source and delivering said fluid to said motor to drive the driven rotor therein, an inlet port in said bearing carrier receiving fluid from said pressure source, a branched passage in said bearing carrier connected to said bearing inlet port and receiving fluid therefrom, valve means in the bearing carrier in one branch of said branched passage acted upon by said fluid from said bearing carrier port and movable thereby to connect the discharge port of said one motor with the inlet of the other motor, a second valve means in the bearing carrier in the other branch of said branched passage resiliently urged to the closed position and acted upon by said fluid entering the inlet port in said bearing carrier whereby said valve is opened at a selected elevated pressure in excess of the spring pressure to connect the said bearing carrier inlet port with the second motor to drive the driven rotor therein and means closing the discharge port of said one motor from communication with the other motor when the second valve is opened.

3. A two speed motor comprising a pair of hydraulically driven rotors on a single shaft, a housing around each of said rotors and said shaft, a bearing carrier and motor spacer between said motors and carrying said shaft journaled therein, an inlet and discharge port on each of said motors, the inlet port on one of said motors receiving fluid under pressure from a pressure source and delivering said fluid to said motor to drive the driven rotor therein, an inlet port in said bearing carrier receiving fluid from said pressure source, normally closed valve means in the bearing carrier acted upon by said fluid from said bearing carrier inlet port connecting the discharge port of said one motor with the inlet of the other motor when fluid is introduced through said bearing inlet port, second normally closed valve means in the bearing carrier normally biased to the closed position under a preselected pressure acted upon by said fluid entering the inlet port in said bearing carrier whereby said valve is opened at an elevated pressure in excess of the biasing pressure to connect the said bearing carrier inlet port with the second motor to drive the driven rotor therein and means closing the discharge port of said one motor from communication with the other motor when the second valve is opened.

4. A two speed motor comprising a pair of hydraulically driven rotors on a single shaft, a housing around each of said rotors and said shaft, a bearing carrier and motor spacer between said motors and carrying said shaft journaled therein, an inlet and discharge port on each of said motors, the inlet port on one of said motors receiving fluid under pressure from a pressure source and delivering said fluid to said motor to drive the driven rotor therein, an inlet port in said bearing carrier receiving fluid from said pressure source, first valve means in the bearing carrier acted upon by said fluid from said bearing carrier inlet port, connections between said valve and the inlet port of the other motor connecting the discharge port of said one motor with the inlet of the other motor whereby said other motor is provided with low pressure fluid, second valve means in the bearing carrier acted upon by said fluid entering the bearing inlet port in said bearing carrier whereby said valve is opened at a selected elevated pressure to connect the said bearing carrier inlet port with the second motor to drive the driven rotor therein and normally open check valve in the connections between said first valve means and the inlet port of the said other motor acted upon by the fluid passing through the second valve and closing the discharge port of said one motor from communication with the other motor when the second valve is opened.

5. A two speed motor comprising a pair of hydraulically driven rotors on a single shaft, a housing around each of said rotors and said shaft, a bearing carrier and motor spacer between said motors and carrying said shaft journaled therein, an inlet and discharge port on each of said motors, the inlet port on one of said motors receiving fluid under pressure from a pressure source and delivering said fluid to said motor to drive the driven rotor therein, an inlet port in said bearing carrier receiving flud from said pressure source, first valve means in the bearing carrier acted upon by said fluid from said bearing carrier inlet port, a connection between said valve and the inlet port of the other motor connecting the discharge port of said one motor with the inlet of the other motor, second valve means in the bearing carrier acted upon by said fluid entering the bearing inlet port in said bearing carrier whereby said valve is opened at a selected elevated pressure, a connection between said second valve and the inlet port of said other motor, a connection from the bearing inlet port to said inlet port of the second motor, check valve means in said connection acted upon by fluid in the connection from the second valve to open said check valve connecting the said bearing carrier inlet port with the second motor to drive the driven rotor therein and means closing the discharge port of said one motor from communication with the other motor when the second valve is opened.

References Cited in the file of this patent
UNITED STATES PATENTS

| | | |
|---|---|---|
| 2,056,908 | Schauer | Oct. 6, 1936 |
| 2,370,526 | Doran | Feb. 27, 1945 |
| 2,374,588 | Doran | Apr. 24, 1945 |